Patented July 7, 1936

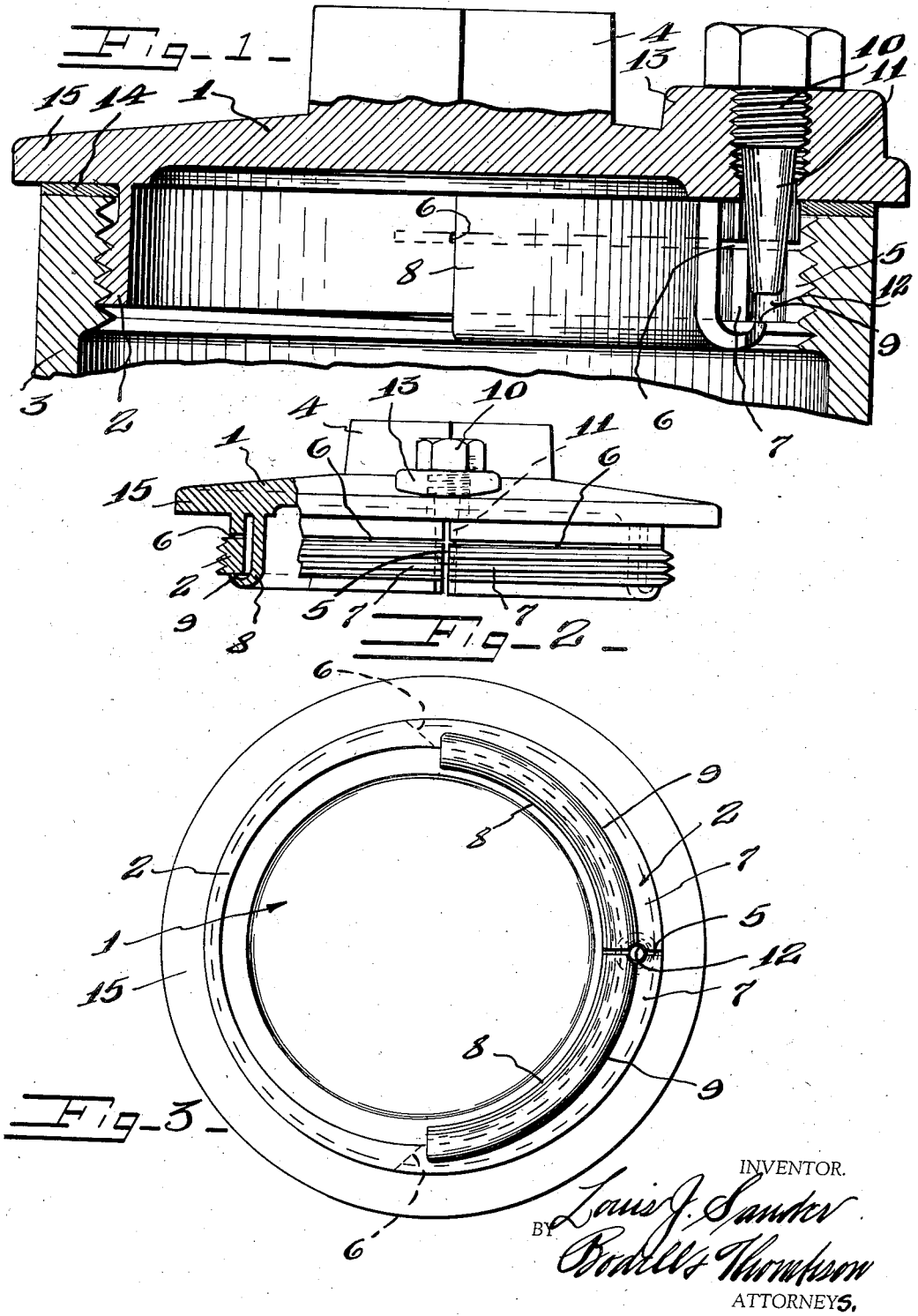

2,046,700

UNITED STATES PATENT OFFICE 2,046,700

CLOSURE PLUG

Louis J. Sander, Buffalo, N. Y.

Application March 7, 1935, Serial No. 9,762

4 Claims. (Cl. 138—89)

This invention relates to closure plugs particularly for pipe ends and other openings, and especially to threaded plugs for threading into threaded openings, and has for its object a particularly simple, expansible and contractile, continuous collar for fitting into the opening, and formed so as to be contractile throughout a considerable extent thereof, together with means for normally holding the flange, or collar, in its circle, or so that the threads mate, or coact, with the threads of the opening in the normal, or usual, manner that a plug threads into an opening, and operable to permit a contractile action of the collar to loosen the threaded collar from the threads of the opening.

This closure plug is particularly designed for what is known as trap screw ferrules, or in situations where the plugs remain in position for a long time, sometimes years, before the necessity arises to remove them. In these situations, the usual plugs become set so tight in the openings that they can not be removed without destroying the plugs, or breaking the pipe. Therefore, one of the principal objects of this invention is a closure plug, or trap screw ferrule, which is comparatively light but which can be readily removed at any time without destroying the plug, or breaking the pipe end.

The invention consists in the novel features and in the combinations and constructions hereinafter set forth and claimed.

In describing this invention, reference is had to the accompanying drawing in which like characters designate corresponding parts in all the views.

Figure 1 is an enlarged, transverse, sectional view of a trap screw ferrule embodying my invention, the contiguous portion of a pipe end being also shown.

Figure 2 is an edge view, partly broken away, of this trap screw ferrule.

Figure 3 is an inner face view.

This closure plug, or trap screw ferrule, comprises generally, a discoidal body having an annular flange, or collar, on its inner side for telescoping into an opening to be closed, as the end of a pipe, the flange being substantially continuous and having radially expansible and contractile portions and means, as an expander, operating to expand said portions and permit the contraction thereof. The flange and pipe end are usually threaded. The contractile action is inward from the normal circle of the flange and expanding action from the contracted position back to the normal circle.

1 designates the body which is usually a casting having an integral annular flange or collar 2 on its inner side, this flange being usually threaded and fitting into the threaded end of a pipe 3. The body is usually provided with a wrench hold 4 on its top. The flange 2 is divided transversely, as at 5, and the portions on opposite sides of the line of division are separated by slots 6 near the base of the flange, and at the upper edge of the threads forming expansible and contractile tongues 7 extending oppositely to each other in a direction circumferentially of the flange terminating at the line of division 5. The slots 6 extend a considerable distance around the flange, here shown as approximately one-quarter of the flange, so that approximately one-half of the flange is separated by the slots 6 from the body.

In order to prevent axial displacement of the flange and hence, possible misalinement of the threads, means is provided for holding the tongues 7 from axial displacement. As here shown, the body is formed with an integral, arcuate brace 8 within the flange or collar 2, or the portion thereof in which the slots 6 are formed, and the outer margin 9 of the flange overhangs and engages the edge of the flange 2 and presses on the lower edges of the tongues 7. The line of division 5 also extends through the brace 8.

The means for expanding the tongues 7 is operable from the outer or upper side of the body 1, and as here shown comprises an expander, as a screw 10 threading through the body 1 and having a tapered end 11 entering a bore between the confronting ends of the tongues 7, and here shown as entering a bore 12 formed partly in the opposing ends of the tongues 7. The conical or tapered end 11 of the screw 10 has a base portion of sufficient diameter to hold the tongues from contracting. That is, hold the tongues in the circle of the collar when the screw is tightened to its full extent. Preferably, when the screw is tightened to the extent that the tongues are in the normal circle of the collar, its head abuts against the top of the boss 13. The screw, as here shown, preferably threads through a boss 13 on the body 1.

In operation, the screw 10 is tightened, thus setting the tongues in the circle of the collar. The cover is screwed into the opening or pipe end. To remove the cap, the screw is loosened. This permits the tongues to contract, or loosen, and if they are tightly set in the threads, light tapping on the outside of the pipe will break the tongues away from the pipe and permit them to contract. The brace 8 prevents distortion of the tongues 7 in an axial direction and hence, misalinement of the threads.

Preferably, a gasket 14 is located around the base of the flange between the margin 15 of the body 1 and end edge of the pipe. The base of the flange adjacent the body 1, that is, the portion surrounded by the gasket is unthreaded, and the slots 6 are provided in the unthreaded portion of the base of the flange 2, or at the inner ends of the threads of the flange 2.

By this invention, not only is the closure easily removable after being set over a long indefinite period, but also it can be made comparatively light, as excessive force is not necessary to dislodge it.

What I claim is:

1. A closure plug comprising a body having a threaded annular flange for fitting a threaded opening to be closed, the flange being substantially continuous and having radially expansible and contractile portions extending in a direction circumferentially of the flange, and means operable from the outer side of the body for expanding and contracting said portions.

2. A closure plug comprising a body having a threaded annular flange for fitting a threaded opening to be closed, the flange being continuous and being divided transversely from its outer edge to its base, and having portions on opposite sides of the line of division separated at the base of the flange from the body forming tongues extending in a direction circumferentially of the flange, and means for radially expanding and contracting said tongues.

3. A closure plug comprising a body having a threaded annular flange for fitting a threaded opening to be closed, the flange being substantially continuous and divided transversely and having approximately a quarter thereof on each side of the line of division separated at the base of the flange from the body forming radially expansible and contractile tongues, the tongues forming approximately, one-half of the flange, and an expander extending between the confronting ends of the tongues and operable from the outer side of the body for expanding and contracting the tongues.

4. A closure plug comprising a body having a threaded annular flange for fitting a threaded opening to be closed, the flange being formed with radial expansible and contractile tongues extending circumferentially of the flange, and the body being provided with means for bracing the tongues against axial displacement, and means operable from the outside of the body for expanding and contracting the tongues.

LOUIS J. SANDER.